United States Patent
Kumar et al.

(10) Patent No.: US 10,037,378 B1
(45) Date of Patent: Jul. 31, 2018

(54) TECHNIQUES FOR CLASSIFYING AND LABELING DATA

(71) Applicant: Symantec Corporation, Mountain View, CA (US)

(72) Inventors: Anudeep Kumar, Meerut (IN);
Yashodhan Pawar, Pune (IN);
Himanshu Dubey, Gwalior (IN);
Ajitesh Roychowdhury, Agartala (IN)

(73) Assignee: SYMANTEC CORPORATION, Mountain View, CA (US)

( * ) Notice: Subject to any disclaimer, the term of this patent is extended or adjusted under 35 U.S.C. 154(b) by 346 days.

(21) Appl. No.: 14/966,797

(22) Filed: Dec. 11, 2015

(51) Int. Cl.
*G06F 17/00* (2006.01)
*G06F 17/30* (2006.01)

(52) U.S. Cl.
CPC .. *G06F 17/30705* (2013.01); *G06F 17/30554* (2013.01)

(58) Field of Classification Search
CPC .. G06F 11/3466; G06F 11/3476; G06F 11/36; G06F 21/552; G06F 2221/2101; G06F 11/3612
See application file for complete search history.

(56) References Cited

U.S. PATENT DOCUMENTS 8,418,249 B1 * 4/2013 Nucci .................. G06F 21/552
706/20

OTHER PUBLICATIONS

Newsome, J., et al., "Polygraph: Automatically Generating Signatures for Polymorphic Worms," Proceedings of the 2005 IEEE Symposium on Security and Privacy, 16 pages. (2005).
Wicherski, Georg, "peHash: A Novel Approach to Fast Malware Clustering," RWTH Aachen University manuscript, 8 pages, retrieved online from URL:<https://www.usenix.org/legacy/event/leet09/tech/full_papers/wicherski/wicherski_html/> (Dec. 7, 2008).

* cited by examiner

*Primary Examiner* — Truong Vo
(74) *Attorney, Agent, or Firm* — Maschoff Brennan (57) ABSTRACT

Techniques for classifying and labeling data are disclosed. In one embodiment, the techniques may be realized as a system for classifying and labeling data comprising one or more processors. The one or more processors may be configured to distribute training data across a plurality of hosts. Each of the hosts may be assigned a random subset of the training data, and configured to cluster its own subset independently. The one or more processors may be further configured to label each cluster of the training data. The one or more processors may be further configured to receive new data, associate the new data with a plurality of the clusters of the training data, and assign the new data a label. The label may be chosen from labels of the plurality of the clusters. And the label may have a maximum associative factor of the new data.

19 Claims, 6 Drawing Sheets

TECHNIQUES FOR CLASSIFYING AND LABELING DATA

FIELD OF THE DISCLOSURE

The present disclosure relates generally to predicting systems, and, more particularly, to techniques for classifying and labeling data.

BACKGROUND OF THE DISCLOSURE

Most "sample class" predicting systems are currently implemented using a single node approach where clustering algorithms have the luxury of evaluating an entire data set together. Each data point can be evaluated in conjunction with other data points. However, the single node approach presents scalability issues, such as cost (more powerful machines are more expensive) and performance (clustering a big data set on a single node may take a long time).

In view of the foregoing, it may be understood that there may be significant problems and/or shortcoming with current predicting systems.

SUMMARY OF THE DISCLOSURE

Techniques for classifying and labeling data are disclosed. In one embodiment, the techniques may be realized as a system for classifying and labeling data comprising one or more processors. The one or more processors may be configured to distribute training data across a plurality of hosts. Each of the hosts may be assigned a random subset of the training data. Each of the hosts may be configured to cluster its own subset independently. The one or more processors may be further configured to label each cluster of the training data. The one or more processors may be further configured to receive new data. The one or more processors may be further configured to associate the new data with a plurality of the clusters of the training data. The one or more processors may be further configured to assign the new data a label. The label may be chosen from labels of the plurality of the clusters. And the label may have a maximum associative factor of the new data.

In accordance with other aspects of this embodiment, to associate the new data, the one or more computer processors may be further configured to compare the new data against a representative sample of each cluster.

In accordance with other aspects of this embodiment, the one or more computer processors may be further configured to associate the new data with a first cluster of the plurality of the clusters if a distance between the new data and the representative sample of the cluster is within a threshold.

In accordance with other aspects of this embodiment, the threshold may be a maximum distance between the representative sample and any data within the first cluster.

In accordance with other aspects of this embodiment, to label each cluster, the one or more computer processors may be further configured to choose from a pre-defined set of labels.

In accordance with other aspects of this embodiment, the one or more computer processors may be further configured to repeat distributing training data and labeling each cluster of the training data a plurality of times.

In accordance with other aspects of this embodiment, at least one of the plurality of hosts may be configured to use a clustering algorithm that is different from any clustering algorithm that is used by any other of the hosts.

In another embodiment, the techniques may be realized as method for classifying and labeling data. According to the method, training data may be distributed across a plurality of hosts. Each of the hosts may be assigned a random subset of the training data. Each of the hosts clusters its own subset independently. Each cluster of the training data may be labeled. New data may be received. The new data may be associated with a plurality of the clusters of the training data. The new data may be assigned a label. The label may be chosen from labels of the plurality of the clusters. The label has a maximum associative factor of the new data.

In still another embodiment, the techniques may be realized as a non-transitory computer readable medium storing a computer-readable program of classifying and labeling data. The program may include computer-readable instructions to distribute training data across a plurality of hosts. Each of the hosts may be assigned a random subset of the training data. Each of the hosts may be configured to cluster its own subset independently. The program may further include computer-readable instructions to label each cluster of the training data. The program may further include computer-readable instructions to receive new data. The program may further include computer-readable instructions to associate the new data with a plurality of the clusters of the training data. The program may further include computer-readable instructions to assign the new data a label. The label may be chosen from labels of the plurality of the clusters. The label may have a maximum associative factor of the new data.

The present disclosure will now be described in more detail with reference to particular embodiments thereof as shown in the accompanying drawings. While the present disclosure is described below with reference to particular embodiments, it should be understood that the present disclosure is not limited thereto. Those of ordinary skill in the art having access to the teachings herein will recognize additional implementations, modifications, and embodiments, as well as other fields of use, which are within the scope of the present disclosure as described herein, and with respect to which the present disclosure may be of significant utility.

BRIEF DESCRIPTION OF THE DRAWINGS

In order to facilitate a fuller understanding of the present disclosure, reference is now made to the accompanying drawings, in which like elements are referenced with like numerals. These drawings should not be construed as limiting the present disclosure, but are intended to be illustrative only.

DETAILED DESCRIPTION OF EMBODIMENTS

In some embodiments, data classifying and labeling as disclosed herein includes distributing training data across multiple nodes in a distributed system. Each node is assigned a random subset of the training data. And each node is configured to run a clustering algorithm to generate clusters on its own. Communications among the nodes, such as training data and/or clustering algorithms, may not be necessary. Running clustering algorithms on small subsets allows evaluation of data locally on each node without communicating with any other node. In other words, each node is configured to cluster the subset it is assigned to independently. For example, a node does not need to communicate with other nodes regarding training data that are assigned to other nodes and/or clustering algorithms on other nodes. This nothing-shared and localized-clustering architecture also allows evaluation of different clustering algorithms very quickly.

Cluster discovery may be done in these small subsets. Clusters and classes are discovered on every node of a distributed system in a training phase (which may include multiple iterations). Combined output of all nodes is then considered as a training output to be used for predicting the class of a new sample. The techniques disclosed herein are "clustering algorithm agnostic." The techniques are not tied to a particular clustering algorithm. In some embodiments, different nodes may run different clustering algorithms.

The disclosure will be described in the context of malware and secure/safe software classification. In other words, in the context of predicting if new data (e.g., software, executable code) is malicious or valid. However, malware classification is just an exemplary application of the techniques disclosed herein. The techniques are not limited to the context of malware detection.

Figure 1:
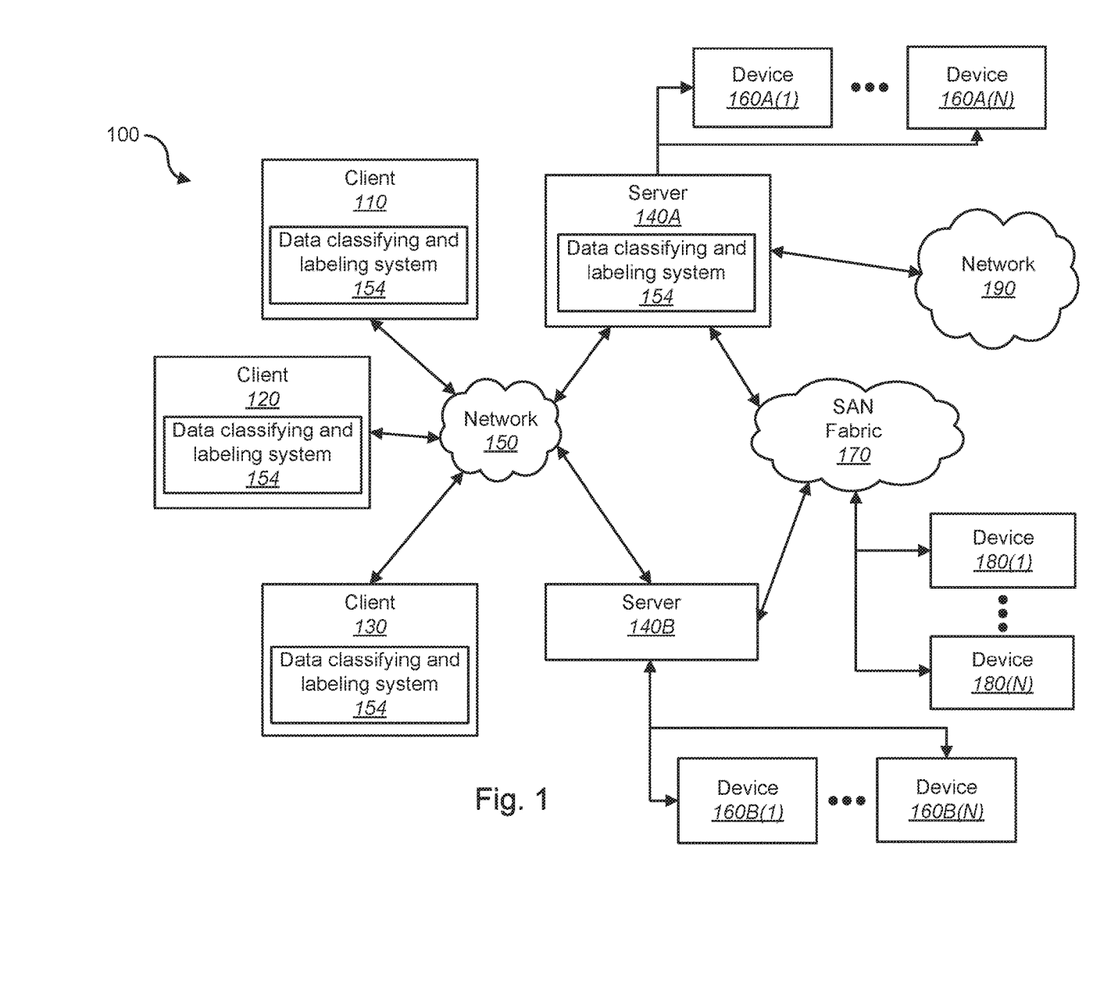
FIG. 1 shows a block diagram depicting a network architecture in accordance with an embodiment of the present disclosure.

FIG. 1 shows a block diagram depicting a network architecture 100 in accordance with an embodiment of the present disclosure. FIG. 1 is a simplified view of network architecture 100, which may include additional elements that are not depicted. Network architecture 100 may contain client systems 110, 120 and 130, as well as servers 140A-140N (one or more of each of which may be implemented using computer system 200 shown in FIG. 2). Client systems 110, 120 and 130 may be communicatively coupled to a network 150. Server 140A may be communicatively coupled to storage devices 160A(1)-(N), and server 140B may be communicatively coupled to storage devices 160B(1)-(N). Servers 140A and 140B may be communicatively coupled to a SAN (Storage Area Network) fabric 170. SAN fabric 170 may support access to storage devices 180(1)-(N) by servers 140A and 140B, and by client systems 110, 120 and 130 via network 150.

Figure 2:
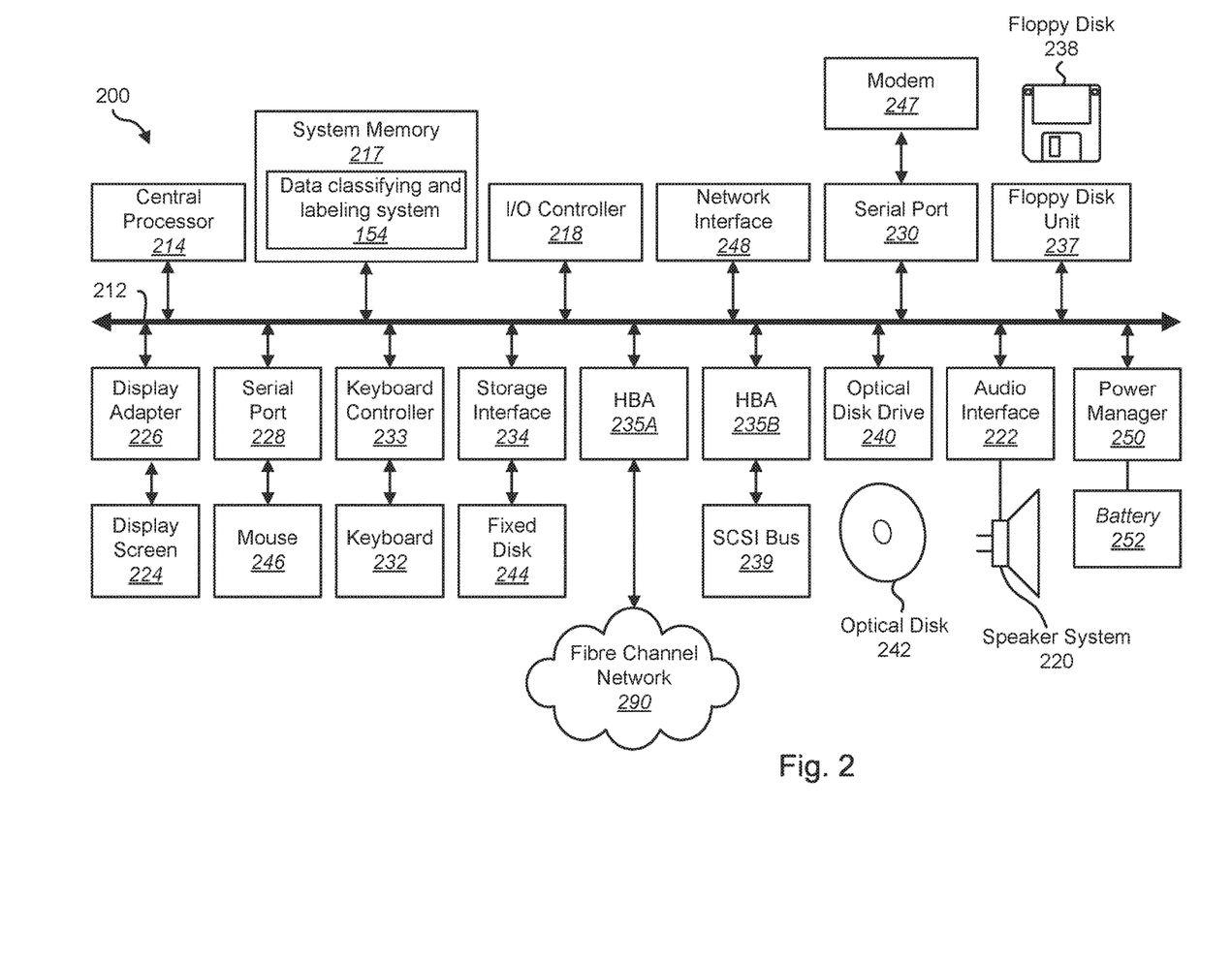
FIG. 2 shows a block diagram depicting a computer system in accordance with an embodiment of the present disclosure.

With reference to computer system 200 of FIG. 2, modem 247, network interface 248, or some other method may be used to provide connectivity from one or more of client systems 110, 120 and 130 to network 150. Client systems 110, 120 and 130 may access information on server 140A or 140B using, for example, a web browser or other client software (not shown). Such a client may allow client systems 110, 120 and 130 to access data hosted by server 140A or 140B or one of storage devices 160A(1)-(N), 160B(1)-(N), and/or 180(1)-(N).

Networks 150 and 190 may be local area networks (LANs), wide area networks (WANs), the Internet, cellular networks, satellite networks, or other networks that permit communication between clients 110, 120, 130, servers 140, and other devices communicatively coupled to networks 150 and 190. Networks 150 and 190 may further include one, or any number, of the exemplary types of networks mentioned above operating as a stand-alone network or in cooperation with each other. Networks 150 and 190 may utilize one or more protocols of one or more clients or servers to which they are communicatively coupled. Networks 150 and 190 may translate to or from other protocols to one or more protocols of network devices. Although networks 150 and 190 are each depicted as one network, it should be appreciated that according to one or more embodiments, networks 150 and 190 may each comprise a plurality of interconnected networks.

Storage devices 160A(1)-(N), 160B(1)-(N), and/or 180(1)-(N) may be network accessible storage and may be local, remote, or a combination thereof to server 140A or 140B. Storage devices 160A(1)-(N), 160B(1)-(N), and/or 180(1)-(N) may utilize a redundant array of inexpensive disks ("RAID"), magnetic tape, disk, a storage area network ("SAN"), an internet small computer systems interface ("iSCSI") SAN, a Fibre Channel SAN, a common Internet File System ("CIFS"), network attached storage ("NAS"), a network file system ("NFS"), optical based storage, or other computer accessible storage. Storage devices 160A(1)-(N), 160B(1)-(N), and/or 180(1)-(N) may be used for backup or archival purposes. Further, storage devices 160A(1)-(N), 160B(1)-(N), and/or 180(1)-(N) may be implemented as part of a multi-tier storage environment.

According to some embodiments, clients 110, 120, and 130 may be smartphones, PDAs, desktop computers, laptop computers, servers, other computers, or other devices coupled via a wireless or wired connection to network 150. Clients 110, 120, and 130 may receive data from user input, a database, a file, a web service, and/or an application programming interface. In some implementations, clients 110, 120, and 130 may specifically be network-capable mobile devices such as smartphones or tablets.

Servers 140A and 140B may be application servers, archival platforms, backup servers, database servers, network storage devices, media servers, email servers, document management platforms, enterprise search servers, or other devices communicatively coupled to network 150. Servers 140A and 140B may utilize one of storage devices 160A(1)-(N), 160B(1)-(N), and/or 180(1)-(N) for the storage of application data, backup data, or other data. Servers 140A and 140B may be hosts, such as an application server, which may process data traveling between clients 110, 120, and 130 and a backup platform, a backup process, and/or storage. According to some embodiments, servers 140A and 140B may be platforms used for backing up and/or archiving data. One or more portions of data may be backed up or archived based on a backup policy and/or an archive applied, attributes associated with the data source, space available for backup, space available at the data source, or other factors.

According to some embodiments, clients 110, 120, and 130 may contain one or more modules such as, for example, data classifying and labeling system 154. Server 140A may include one or more modules such as, for example, data classifying and labeling system 154. Further, one or more portions of the data classifying and labeling system 154 may reside at a network centric location. For example, server 140A may be a server, a firewall, a gateway, or other network element that may perform one or more actions to support management of system and network security elements. According to some embodiments, network 190 may be an external network (e.g., the Internet) and server 140A may be a gateway or firewall between one or more internal components and clients and the external network. According to some embodiments, analysis and approval of resource references including data classifying and labeling system 154 may be implemented as part of a cloud computing environment. For example, data classifying and labeling system 154 may be distributed to various clients and servers through a cloud computer environment. For another example, data classifying and labeling system 154 may be updated at the network centric location and then distributed to various clients and servers.

FIG. 2 shows a block diagram of a computer system 200 in accordance with an embodiment of the present disclosure. Computer system 200 may be suitable for implementing methods and systems in accordance with the present disclosure. Computer system 200 may include a bus 212 which may interconnect major subsystems of computer system 200, such as a central processor 214, a system memory 217 (e.g. RAM (Random Access Memory), ROM (Read Only Memory), flash RAM, or the like), an Input/Output (I/O) controller 218, an external audio device, such as a speaker system 220 via an audio output interface 222, an external device, such as a display screen 224 via display adapter 226, serial ports 228 and 230, a keyboard 232 (interfaced via a keyboard controller 233), a storage interface 234, a floppy disk drive 237 operative to receive a floppy disk 238, a host bus adapter (HBA) interface card 235A operative to connect with a Fibre Channel network 290, a host bus adapter (HBA) interface card 235B operative to connect to a SCSI bus 239, and an optical disk drive 240 operative to receive an optical disk 242. Also included may be a mouse 246 (or other point-and-click device, coupled to bus 212 via serial port 228), a modem 247 (coupled to bus 212 via serial port 230), network interface 248 (coupled directly to bus 212), power manager 250, and battery 252.

Bus 212 allows data communication between central processor 214 and system memory 217, which may include read-only memory (ROM) or flash memory (neither shown), and random access memory (RAM) (not shown), as previously noted. The RAM may be the main memory into which the operating system and application programs may be loaded. The ROM or flash memory can contain, among other code, the Basic Input-Output system (BIOS) which controls basic hardware operation such as the interaction with peripheral components. Applications resident with computer system 200 may be stored on and accessed via a computer readable medium, such as a hard disk drive (e.g., fixed disk 244), an optical drive (e.g., optical drive 240), a floppy disk unit 237, a removable disk unit (e.g., Universal Serial Bus drive), or other storage medium. According to some embodiments, data classifying and labeling system 154 may be resident in system memory 217.

Storage interface 234, as with the other storage interfaces of computer system 200, can connect to a standard computer readable medium for storage and/or retrieval of information, such as a fixed disk drive 244. Fixed disk drive 244 may be a part of computer system 200 or may be separate and accessed through other interface systems. Modem 247 may provide a direct connection to a remote server via a telephone link or to the Internet via an internet service provider (ISP). Network interface 248 may provide a direct connection to a remote server via a direct network link to the Internet via a POP (point of presence). Network interface 248 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 2 need not be present to practice the present disclosure. The devices and subsystems can be interconnected in different ways from that shown in FIG. 2. Code to implement the present disclosure may be stored in computer-readable storage media such as one or more of system memory 217, fixed disk 244, optical disk 242, or floppy disk 238. Code to implement the present disclosure may also be received via one or more interfaces and stored in memory. The operating system provided on computer system 200 may be MS-DOS®, MS-WINDOWS®, OS/2®, OS X®, UNIX®, Linux®, or another known operating system.

Power manager 250 may monitor a power level of battery 252. Power manager 250 may provide one or more APIs (Application Programming Interfaces) to allow determination of a power level, of a time window remaining prior to shutdown of computer system 200, a power consumption rate, an indicator of whether computer system is on mains (e.g., AC Power) or battery power, and other power related information. According to some embodiments, APIs of power manager 250 may be accessible remotely (e.g., accessible to a remote backup management module via a network connection). According to some embodiments, battery 252 may be an Uninterruptable Power Supply (UPS) located either local to or remote from computer system 200. In such embodiments, power manager 250 may provide information about a power level of an UPS.

Figure 3:
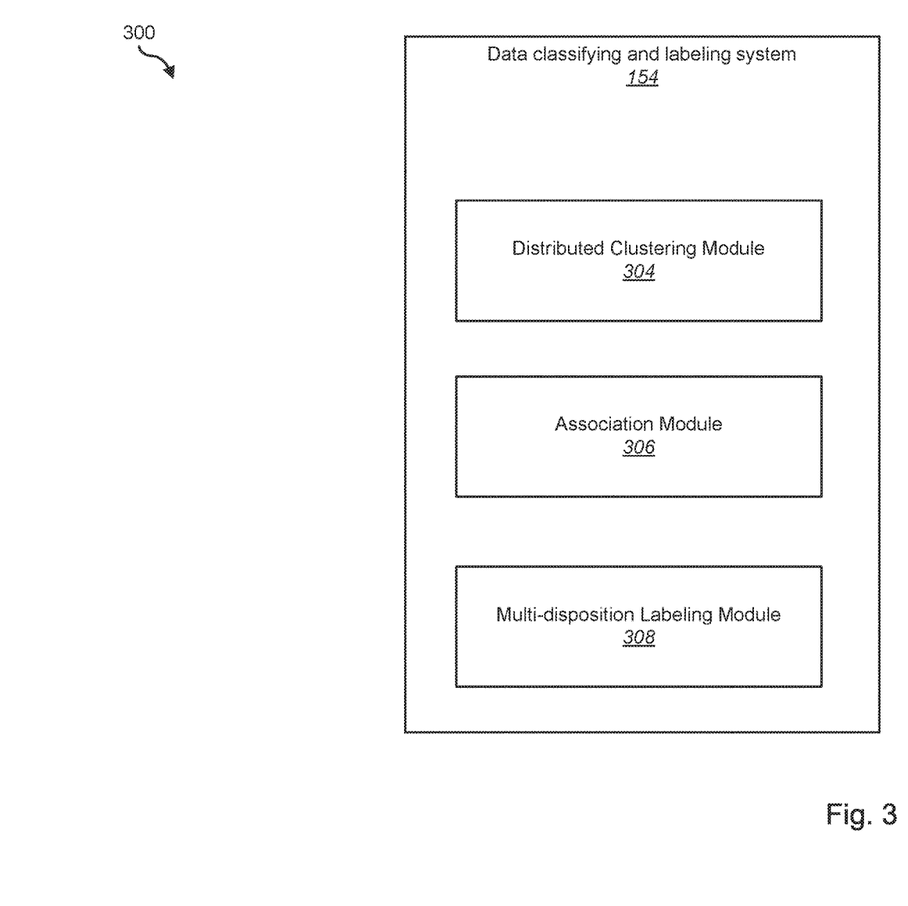
FIG. 3 shows a block diagram illustrating the data classifying and labeling system shown in FIG. 1 in accordance with an embodiment of the present disclosure.

FIG. 3 shows a block diagram illustrating the data classifying and labeling system shown in FIG. 1 in accordance with an embodiment of the present disclosure. Data classifying and labeling system 154 may reside on a client, such as an end-user device, a host, and a node, and/or a server, such as a web server. In some embodiments, data classifying and labeling system 154 includes distributed clustering module 304, association module 306, and multi-disposition labeling module 308. Distributed clustering module 304 may reside on nodes in a distributed system. Distributed clustering module 304 may distribute training data across multiple nodes in a distributed system. Each node may be assigned a random subset of the training data. Each node may only cluster the subset that it is assigned to. In some embodiments, a node may not know about the training data that are assigned to other nodes. A node may not know about the clustering algorithms on other nodes. In some implementations, there may be no inter-node communications, including but not limited to the training data or clustering algorithms. Various clustering algorithms may be run on the nodes. In some implementations, the K—Centroid clustering algorithm (Gonzalez Approximation) is implemented. Clusters may be generated based on the feature vectors. Some of the features in clustering may include but not limited to number of sections in a file, file size, and file hander. As many as 65 or 100 features may be used for clustering.

In some implementations, the training data may include ground truth. Ground truth are data whose characteristics/classes are known. For example, some training data may be known as malware, and some training data may be known as secure or safe ware (i.e. valid). Each cluster may be labeled based on a threshold percentage of how much ground truth is contained within the cluster. For example, if a cluster contains known malware but no known secure/safe ware, and the known malware exceeds the threshold, then the cluster may be labeled as "malicious." An example threshold may be 60%. If a cluster contains known secure/safe ware but no known malware, and the known secure/safe ware exceeds the threshold, then the cluster may be labeled as "valid." If a cluster contains both known malware and known secure/safe ware, the cluster may be labeled "mixed." If a cluster is pure (e.g., contains known malware but no known secure/safe ware, or contains known secure/safe ware but no known malware), but the known malware or known secure/safe ware is below the threshold, the cluster may be labeled "less ground truth malicious" or "less ground truth valid." If a cluster contains no known malware or known secure/safe ware, the cluster may be labeled "no ground truth." Distributed clustering module 304 will be described in further detail in relation to FIGS. 4A and 4B.

Still referring to FIG. 3, in some implementations, association module 306 may associate new data whose class is unknown to multiple clusters that have been produced by the multiple nodes in the distributed system. Each cluster may have a representative sample, The representative sample maybe a piece of data within the cluster, which represents the most typical data of the cluster. In some embodiments, the representative sample is the centroid of the cluster. In other embodiments, the representative sample is the medoid of the cluster.

The new data may be compared to representative samples from all the clusters. In some implementations, if the distance between the representative sample of a cluster and the new data is within a threshold, the new data may be associated with the cluster. For example, if the distance between the representative sample of a cluster and the new data is within the maximum distance between the representative sample and any other data within the cluster, the new data is associated with the cluster. In other words, the new data would have been included in the cluster if the new data were included in the training data. Association module 306 will be described in further detail with respect to FIGS. 5A and 5B.

With continued reference to FIG. 3, in some implementations, multi-disposition labeling module 308 may label the new data with the label that has the maximum associative factor. In other words, multi-disposition labeling module 308 labels the new data with the label that is most closely related to the new data. In some implementations, an associative factor between a label and the new data is based on several parameters. For example, the associative factor may depend on the distance between the new data and a representative sample. The less distance between the new data and the representative sample, the bigger the associative factor. The associative factor may also depend on the weight of a particular label. Some labels may have higher weight than others. For example, the label "malicious" may have a weight of 1. The label "valid" may have a weight of 0.2. The weight may be adjusted based on error rate, or to reduce false positive or false negative, etc. The associative factor may also depend on the number of a specific label. For example, the new data may be associated with 5 "malicious" labels and 2 "valid" labels.

In some embodiments, a minimum percentage of count of labels may be required. For example, the minimum percentage may be 1%. If the new data is associated with 1 "valid" label, but 100 "malicious" labels, that the association with the "valid" label may be excluded. The minimum percentage requirement may balance the factor of a very small distance. For example, the new data is associated with only 1 "valid" label, but 100 "malicious" labels. However, if the distance between the new data and the representative sample of the cluster labeled "valid" is very small, the associative factor between the "valid" label and the new data may become the maximum associative factor, which may introduce false positive. In some embodiments, multi-disposition labeling module 308 may label the new data on the equivalent of the follow equation:

Final Label=Label with max(Associativity Factor)

where, $$\text{Associativity Factor} = w_k \sum_{i=1}^{n} \frac{1}{d_i}$$

w=weightage of label 'k'
n=number of representative samples having label 'k'
d=distance with $i^{th}$ representative sample having label 'k'
outlier handling: Final Label=Label with max(Associativity Factor) and minimum percentage of count.

Figure 4A:
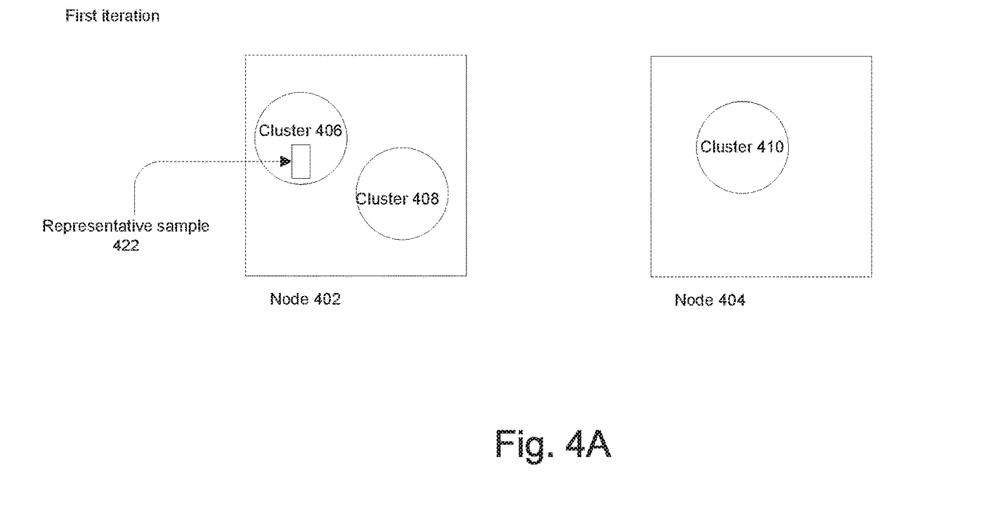
FIG. 4A shows a block diagram illustrating the data classifying and labeling system shown in FIG. 1 in accordance with an embodiment of the present disclosure.

FIG. 4A shows a block diagram illustrating the data classifying and labeling system shown in FIG. 1 in accordance with an embodiment of the present disclosure. Training data may be distributed across multiple nodes in a distributed system, for example, node 402 and 404. Each node may be assigned a random subset of the training data and clusters its own subset locally. For example, node 402 generates cluster 406 and cluster 408 based on its own subset and node 404 generates cluster 410 based on its own subset. Each cluster will be assigned a label, such as "valid," "malicious," etc.

Figure 4B:
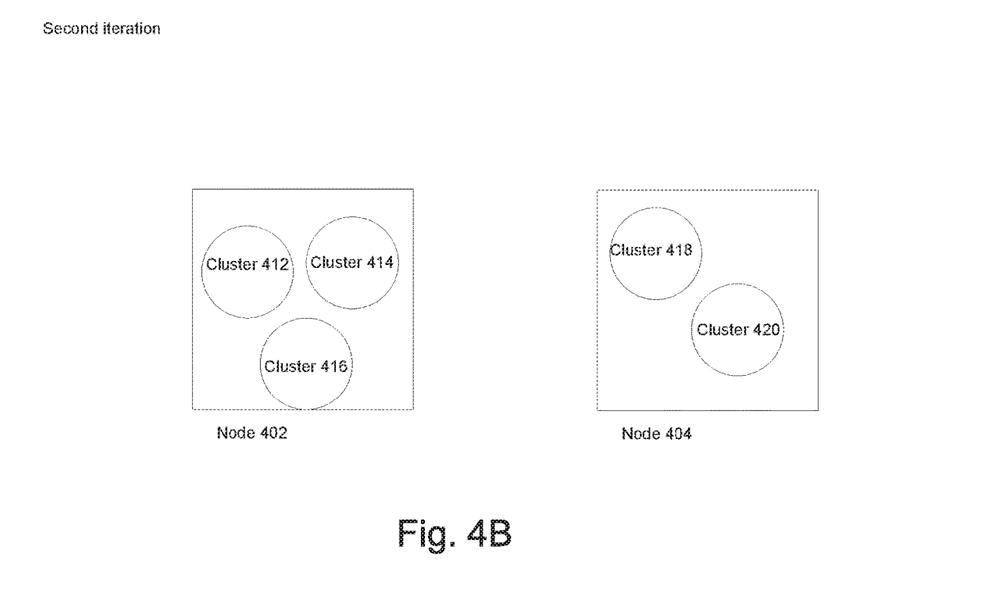
FIG. 4B shows a block diagram illustrating the data classifying and labeling system shown in FIG. 1 in accordance with an embodiment of the present disclosure.

FIG. 4B shows a block diagram illustrating the data classifying and labeling system shown in FIG. 1 in accordance with an embodiment of the present disclosure. In some embodiments, the localized clustering may be repeated multiple times, for example, 5 times. The same training data may be distributed to multiple nodes with different randomized subset for multiple iterations. As shown in FIG. 4B, in another iteration, the training data is distributed to node 402 and node 404 with random subsets. In the second iteration, Node 402 generates clusters 412/414/416. Node 404 generates clusters 418/420. Each cluster has a representative sample as the most typical data within the cluster. For example, cluster 406 has the representative sample 422.

Figure 5A:
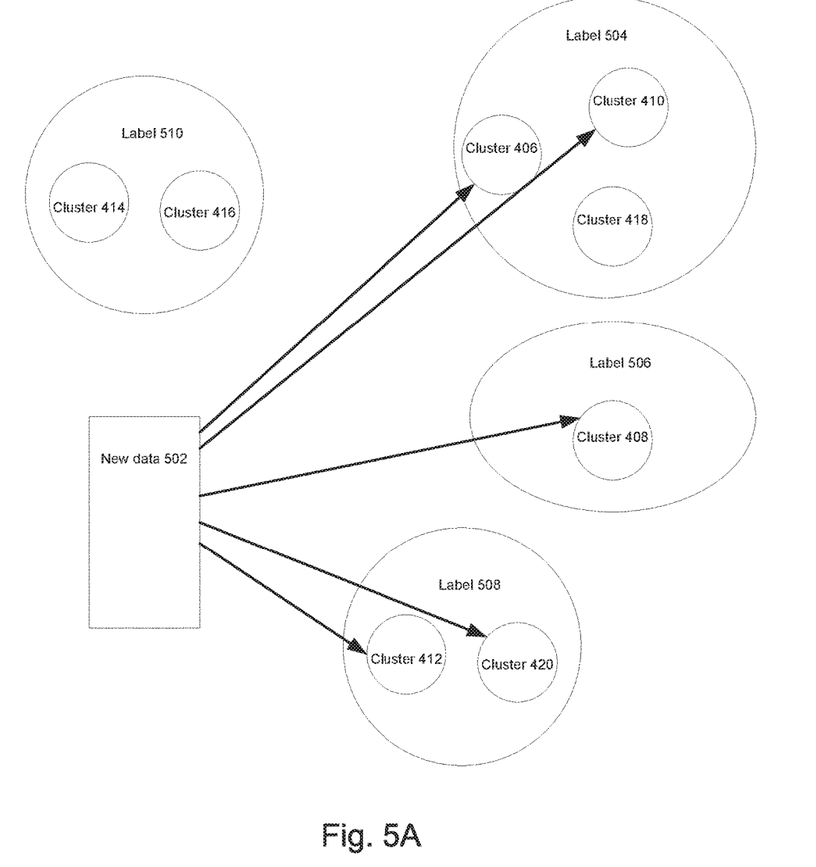
FIG. 5A shows a block diagram illustrating the data classifying and labeling system shown in FIG. 1 in accordance with an embodiment of the present disclosure.

FIG. 5A shows a block diagram illustrating the data classifying and labeling system shown in FIG. 1 in accordance with an embodiment of the present disclosure. As shown in FIG. 5A and described above, new data 502 may be compared against each cluster that is produced by the distributed clustering model. More specifically, the new data 502 may be compared against the representative sample of each cluster. The clusters that the new data 502 may be compared against may include all clusters produced from all nodes and from multiple iterations. New data 502 may be associated with multiple clusters. As described above, association may depend on the distance between the new data 502 and a representative sample of each cluster. As shown in FIG. 5A, among all the clusters 406-420, new data may be associated with clusters 406, 408, 410, 412, and 420. Clusters may share the same label. By way of example, clusters 406/410/418 may be labeled "malicious"; cluster 408 may be labeled "valid"; clusters 412/420 may be label "no ground truth;" clusters 414/416 may be labeled "less ground truth valid."

Figure 5B:
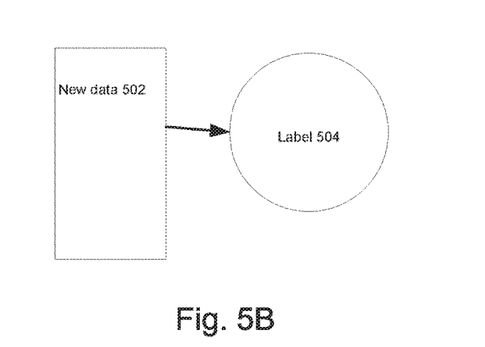
FIG. 5B shows a block diagram illustrating the data classifying and labeling system shown in FIG. 1 in accordance with an embodiment of the present disclosure.

FIG. 5B shows a block diagram illustrating the data classifying and labeling system shown in FIG. 1 in accordance with an embodiment of the present disclosure. As shown in FIG. 5B, based on associative factors among the multiple labels, new data may be associated with label 504 (e.g., "malicious") in accordance with the maximum associative factor.

Figure 6:
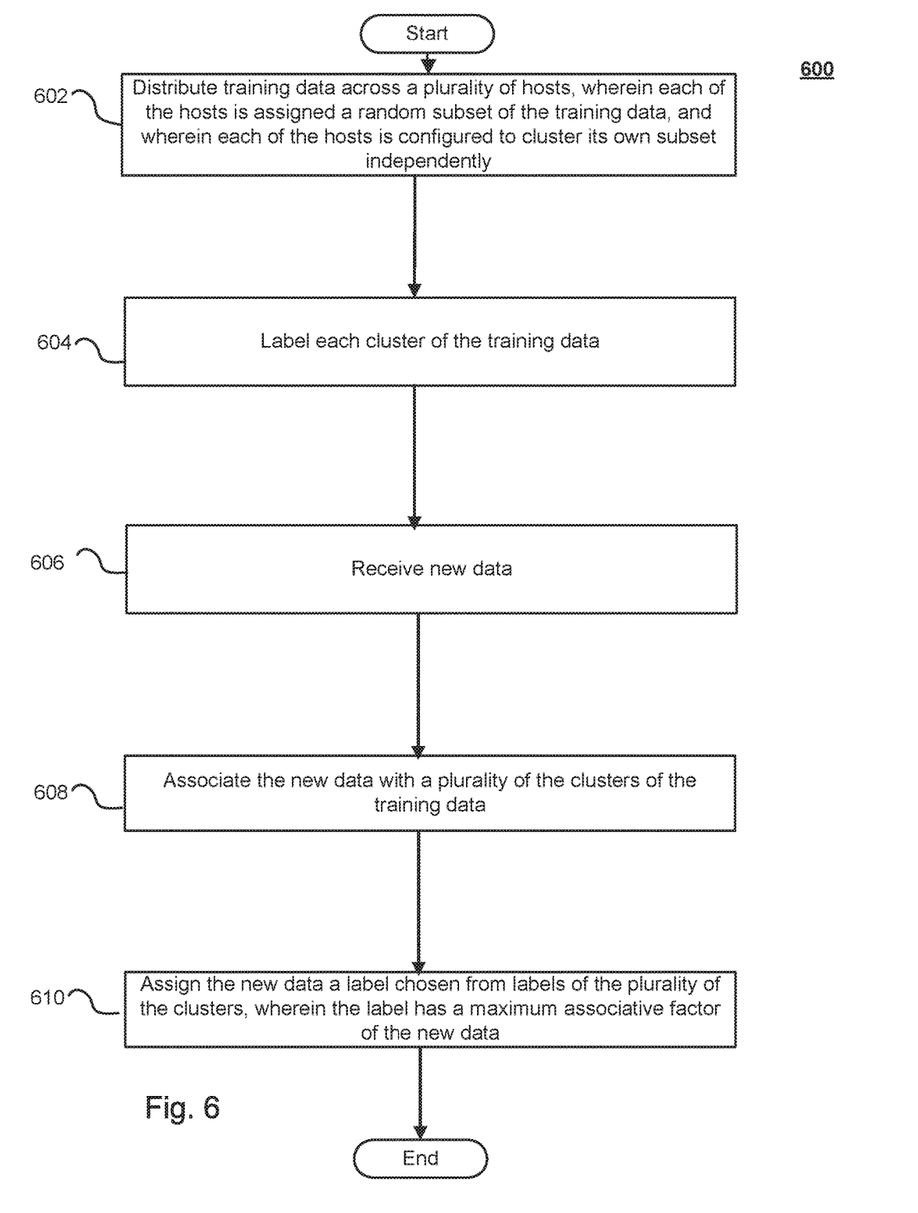
FIG. 6 shows a flowchart for classifying and labeling data in accordance with an example method of the present disclosure.

FIG. 6 shows a flowchart for classifying and labeling data in accordance with an example method 600 of the present disclosure.

Method 600 may include distributing training data across a plurality of hosts wherein each of the hosts is assigned a random subset of the training data and each of the hosts is configured to cluster its own subset independently (602), labeling each cluster of the training data (604), receiving new data (606), associating the new data with a plurality of the clusters of the training data (608), and assigning the new data a label chosen from labels of the plurality of the clusters, wherein the label has a maximum associative factor of the new data (610).

Method 600 may also include distributing training data across a plurality of hosts such that each of the hosts is assigned a random subset of the training data and each of the hosts is configured to cluster its own subset independently (602). In some implementations, as described above, each node clusters a randomly assigned subset of the training data locally. In some embodiments, a host may use a clustering algorithm that is different from any clustering algorithm that is used by any other of the hosts.

At step 604, each cluster of the training data may be labeled. In some implementations, the labels may be chosen form a pre-defined list of labels. As described above, as the training data may contain ground truth, a cluster may be labeled based on the characteristics of the ground truth contained in the cluster. In some embodiments, the labeling of clusters may be automatic. In other embodiments, the labeling of clusters may involve manual curation. For example, if ground truth contain in a cluster is below a threshold, the cluster may be labeled manually.

At step 606, new data may be received. The new data may be a new sample whose class or characteristic is unknown. For example, the new data may be software that needs to classified as malware or secure/safe ware.

At step 608, the new data may be associated with a plurality of the clusters of the training data. As described above, the new data may be compared against all clusters from all nodes. The association may be determined based on the distance between the new data and the representative sample of a cluster.

At step 610, the new data may be labeled chosen from labels of the plurality of the clusters, wherein the label has a maximum associative factor of the new data. As described above, the label with the maximum associative factor may be chosen. The associative factor may depend on the distance between the new data and a representative sample of a cluster, the number of a specific associated label, and the percentage count of a specific associated label.

At this point it should be noted that data classification and labeling in accordance with the present disclosure as described above may involve the processing of input data and the generation of output data to some extent. This input data processing and output data generation may be implemented in hardware or software. For example, specific electronic components may be employed in distributed clustering module, association module, multi-disposition labeling module, or similar or related circuitry for implementing the functions associated with data classification and labeling in accordance with the present disclosure as described above. Alternatively, one or more processors operating in accordance with instructions may implement the functions associated with data classification and labeling in accordance with the present disclosure as described above. If such is the case, it is within the scope of the present disclosure that such instructions may be stored on one or more non-transitory processor readable storage media (e.g., a magnetic disk or other storage medium), or transmitted to one or more processors via one or more signals embodied in one or more carrier waves.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of at least one particular implementation in at least one particular environment for at least one particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

The invention claimed is:

1. A system for classifying and labeling data, comprising one or more computer processors configured to:
   distribute a first random subset of training data to a first host in a distributed system, wherein the first host is configured to independently generate one or more first host clusters from the first random subset of training data;
   distribute a second random subset of training data to a second host in the distributed system, wherein the second host is configured to independently generate one or more second host clusters from the second random subset of training data;
   label each of the first and second host clusters with a label that indicates whether the data within the host clusters includes malware, wherein at least one host cluster is assigned a label that indicates inclusion of malware;
   receive new data;
   compare the new data to the first and second host clusters;
   associate the new data with a plurality of host clusters, wherein the plurality of host clusters includes the at least one host cluster assigned the label that indicates inclusion of malware;
   find that the new data has a maximum associative factor with the at least one host cluster that includes malware; and
   assign the new data the label that indicates inclusion of malware.

2. The system of claim 1, wherein to associate the new data with the plurality of host clusters, the one or more computer processors are further configured to compare the new data against a representative sample of each host cluster.

3. The system of claim 2, wherein the one or more computer processors are further configured to associate the new data with a host cluster if a distance between the new data and the representative sample of the host cluster is within a threshold.

4. The system of claim 3, wherein the threshold is a maximum distance between the representative sample and any data within the host cluster.

5. The system of claim 1, wherein to label each host cluster, the one or more computer processors are further configured to choose from a pre-defined set of labels.

6. The system of claim 1, wherein the one or more computer processors are further configured to repeat distributing training data and labeling each host cluster a plurality of times.

7. The system of claim 1, wherein the first host is configured to use a clustering algorithm that is different from any clustering algorithm that is used by the second host.

8. The system of claim 1, wherein the first host and second host generate clusters based on feature vectors.

9. The system of claim 1, wherein the training data includes ground truth.

10. The system of claim 9, wherein the at least one host cluster assigned a label that indicates inclusion of malware is assigned this label based on a threshold percentage of ground truth contained within the at least one host cluster.

11. A non-transitory computer readable medium storing a computer-readable program of classifying and labelling data, comprising:
  computer-readable instructions to distribute a first random subset of training data to a first host in a distributed system, wherein the first host is configured to independently generate one or more first host clusters from the first random subset of training data;
  computer-readable instructions to distribute a second random subset of training data to a second host in the distributed system, wherein the second host is configured to independently generate one or more second host clusters from the second random subset of training data;
  computer-readable instructions to label each of the first and second host clusters with a label that indicates whether the data within the host clusters includes malware, wherein at least one host cluster is assigned a label that indicates inclusion of malware;
  computer-readable instructions to receive new data;
  computer-readable instructions to compare the new data to the first and second host clusters;
  computer-readable instructions to associate the new data with a plurality of host clusters, wherein the plurality of host clusters includes the at least one host cluster assigned the label that indicates inclusion of malware;
  computer-readable instructions to find that the new data has a maximum associative factor with the at least one host cluster that includes malware; and
  computer-readable instructions to assign the new data the label that indicates inclusion of malware.

12. The non-transitory computer readable medium according to claim 11, further comprising computer-readable instructions to compare the new data against a representative sample of each host cluster.

13. The non-transitory computer readable medium according to claim 12, further comprising computer-readable instructions to associate the new data with a host cluster if a distance between the new data and the representative sample of the host cluster is within a threshold.

14. The non-transitory computer readable medium according to claim 13, wherein the threshold is a maximum distance between the representative sample and any data within the host cluster.

15. The non-transitory computer readable medium according to claim 11, further comprising computer-readable instructions to choose from a pre-defined set of labels.

16. The non-transitory computer readable medium according to claim 11, further comprising computer-readable instructions to repeat distributing training data and labeling each host cluster a plurality of times.

17. The non-transitory computer readable medium according to claim 11, wherein the first host and second host generate clusters based on feature vectors.

18. The non-transitory computer readable medium according to claim 11, wherein the training data includes ground truth.

19. The non-transitory computer readable medium according to claim 18, wherein the at least one host cluster assigned a label that indicates inclusion of malware is assigned this label based on a threshold percentage of ground truth contained within the at least one host cluster.

* * * * *